June 6, 1939.  T. B. DOE ET AL  2,161,143
POWER TRANSMISSION
Filed Oct. 28, 1936   2 Sheets-Sheet 2
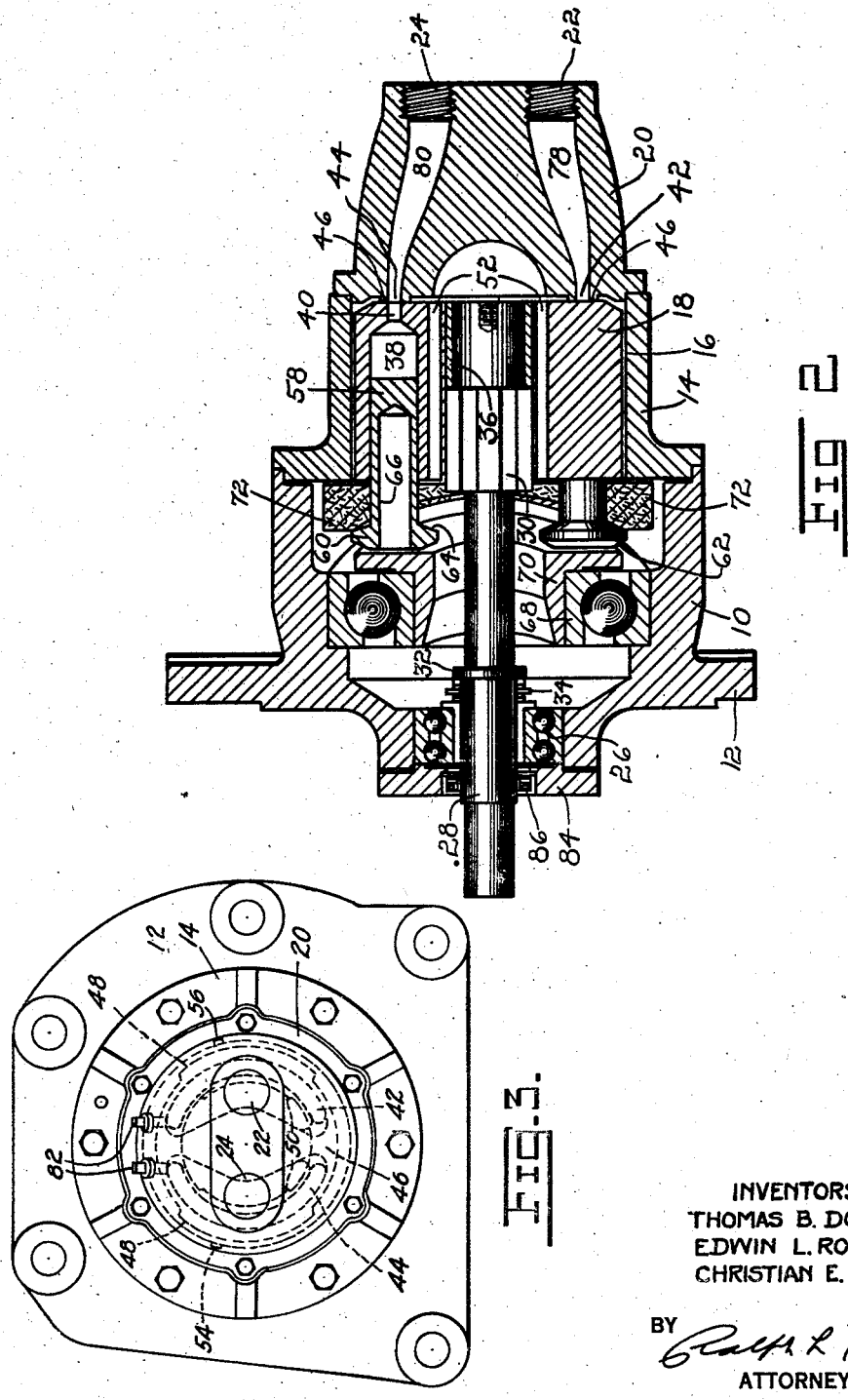
INVENTORS
THOMAS B. DOE
EDWIN L. ROSE
CHRISTIAN E. GROSSER
BY
Ralph L. Tweedale
ATTORNEY Patented June 6, 1939

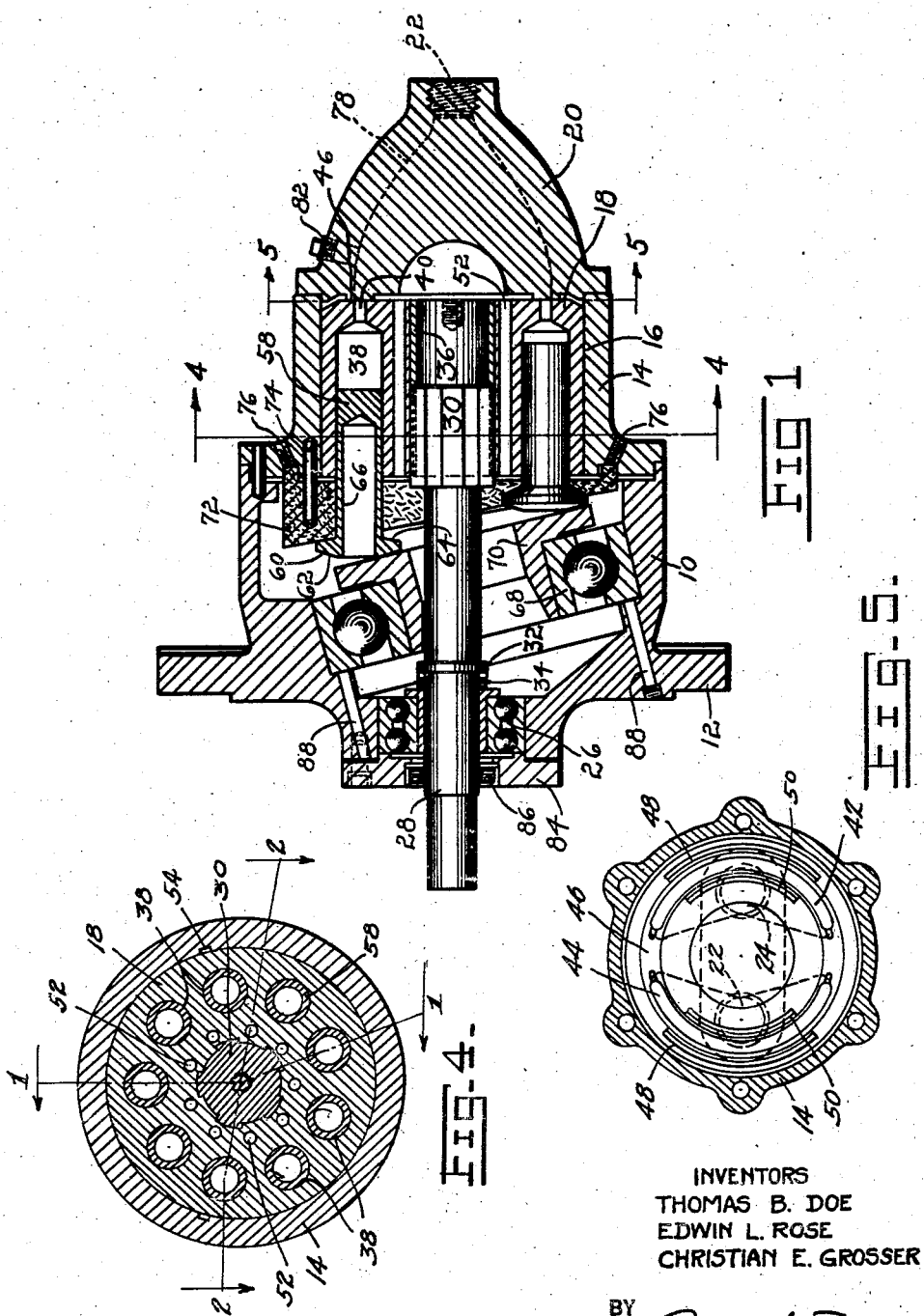

2,161,143

UNITED STATES PATENT OFFICE 2,161,143

POWER TRANSMISSION

Thomas B. Doe, New York, N. Y., and Edwin L. Rose, Watertown, and Christian E. Grosser, Waterbury, Conn., assignors to The Waterbury Tool Company, Waterbury, Conn., a corporation of Connecticut Application October 28, 1936, Serial No. 108,000

4 Claims. (Cl. 103—162)

This invention relates to power transmissions and more particularly to those of the character wherein two or more fluid pressure energy translating devices such as a fluid motor and pump are connected together by conduits for the transmission of power therebetween at variable speeds.

It is an object of the present invention to provide a fluid pressure energy translating device of simple and reliable construction suitable for low cost manufacture and capable of high performance.

More specifically it is an object to provide a fluid pressure energy translating device of the type having a revolving cylinder barrel with a plurality of parallel cylinders therein, in which the pistons act directly against an inclined thrust plate without the use of pivoted connecting rods and wherein a simple, positive, and noiseless means is provided for maintaining the piston in contact with the thrust ring.

A further object is to provide an improved piston construction for devices of this character whereby the detrimental effects of centrifugal force may be substantially reduced.

It is also an object to improve the efficiency of such devices by the use of specially shaped valve plate passages which produce a minimum of frictional drag and eddy current losses on the stream of liquid flowing therethrough.

Further objects and advantages of the present invention will be apparent from the following description, reference being had to the accompanying drawings wherein a preferred form of the present invention is clearly shown.

In the drawings:

Fig. 1 is a longitudinal cross section on line 1—1 of Fig. 4 of a fluid pressure energy translating device incorporating a preferred form of the present invention.

Fig. 2 is a cross section on line 2—2 of Fig. 4.

Fig. 3 is an end view of the device illustrated in Fig. 1.

Fig. 4 is a cross section on line 4—4 of Fig. 1.

Fig. 5 is a cross section on line 5—5 of Fig. 1.

The present invention is concerned with the construction of a fluid pressure energy translating device which may function either as a pump, if mechanical power be applied to a shaft, thus delivering fluid to and from its outlet and inlet connections, or which may function as a fluid motor, if pressure fluid be delivered to and withdrawn from the fluid connections, thus causing the shaft of the device to rotate. The invention is illustrated as incorporated in a fixed displacement device although it will be understood that many features thereof may be incorporated in devices of variable displacement.

Referring now to Fig. 1 there is shown a casing comprising a main member 10 having a flange 12 whereby the device as a whole may be mounted to a suitable support. Secured to the member 10 is an intermediate casing member 14, the interior of which forms a bearing 16 for a cylinder barrel 18. The end of the intermediate casing member 14 is closed by a valve plate 20 having fluid inlet and outlet conduit connections 22 and 24. Journalled on bearings 26 in the casing member 10 is a shaft 28 which is splined at 30 to an interior bore in the cylinder barrel 18. The shaft 28 is formed with a shoulder 32 between which and the bearing 26 is mounted a pair of corrugated spring washers 34 for urging the shaft 28 to the right in Figs. 1 and 2. The interior bore of the cylinder barrel 18 is provided with an abutment sleeve 36 rigidly secured thereto and against which the end of the splined section 30 of the shaft 28 abuts, whereby the springs 34 may urge the cylinder barrel 18 into contact with the flat face of the valve plate 20.

The barrel 18 is provided with a plurality, preferably an odd number, of cylinder bores 38 which are open at one end and at the opposite end are formed with ports 40 of a smaller cross section than that of the cylinder bores 38. The ports 40 are adapted to alternately register with a pair of arcuate valve plate ports 42 and 44 (see Fig. 5) formed in the valve plate 20. The ports 42 and 44 are formed in a raised annular contact surface 46 which is so proportioned with respect to the area of the cylinder bores 38 and the ports 40 as to approximate a balance between all the fluid pressure forces acting on the cylinder barrel 18 in a direction parallel to its axis. Auxiliary pads 48 and 50 may be formed adjacent the contact band 46 to provide additional bearing surface for the cylinder barrel 18 against the valve plate 20. The space radially inwardly and outwardly of the band 46 is relieved as seen in Fig. 1 to provide a path for whatever fluid leakage may occur between the barrel 18 and the valve plate 20. For the purpose of relieving this leakage on the inner side of the band 46, the barrel 18 is provided with a plurality of longitudinal bores 52 leading to the opposite end of the cylinder barrel. For the purpose of relieving leakage outwardly of the band 46, a pair of grooves 54 and 56 are formed in the bearing 16 extending the full length thereof. These grooves serve not only to relieve leakage but also to distribute fluid along the full length of the bearing 16 and for this purpose are preferably located as illustrated in Fig. 4 so that for either direction of rotation of the barrel 18 under load, one of the grooves will lie at the entering edge of the pressure area in the bearing.

Reciprocably mounted in each of the bores 38 is a piston 58 having a flange portion 60 formed on its outer end. The flanges 60 are preferably formed with an outer frusto-conical surface 62 and with an oppositely facing frusto-conical inner surface 64. The pistons 58 are preferably hollowed out as at 66 for better mass distribution under centrifugal force. Thus, the depth of the bore 66 is preferably such as to bring the center of gravity of the piston as a whole well within the area of contact of the piston with the cylinder bore 38.

Rotatably mounted in the casing member 10 on a combined radial and thrust bearing 68 is a thrust plate 70 against which the flanges 60 abut. The angle of inclination of the thrust plate 70 to the axis of the shaft 28 is such that the conical surfaces 62 abut against the plate 70 along a line contact. In order to reduce the dimensions of the bearing 68 the axis thereof may be displaced upwardly from the theoretically ideal position so that it intersects the shaft axis at a point to the rear of the point where a plane through the apices of the imaginary cones normal to the conical surfaces 62, when each of the pistons is at mid stroke, would intersect the shaft axis. For the purpose of maintaining the flanges 60 in contact with the thrust plate 70 on their back stroke, an annular piston return cam 72 is mounted on the intermediate casing member 14 to engage the conical surfaces 64 of the pistons 58. This return cam is preferably formed of a non-metallic material, such as Bakelite, and is generated to contact the conical surfaces 64 at all positions thereof by a line contact. The cam 72 is prevented from rotation by a dowel pin 74 and may be adjusted toward the thrust plate 70 by screws 76.

The valve plate 20 is formed with passages 78 and 80 communicating between the arcuate ports 42 and 44 and the conduit connections 22 and 24 respectively. These passages are preferably of a length at least as great as the mid-diameter of the arcuate ports 42 and 44 and in that length are gradually tapered from the shape of the ports down to a circular shape at the connections 22 and 24. Suitable vent connections 82 may be formed in the valve plate communicating with each of the passages 78 and 80. The casing member 10 is provided with an end cap 84 containing an oil seal 86 for preventing the leakage of fluid from the interior of the casing. Suitable plugged holes 88 are also provided in the member 10 through which knock out pins may be inserted when it is necessary to remove the bearing 68.

In operation assuming the device to be operating as a fluid motor and that pressure fluid is delivered through the connection 22 and passage 78 to the valve port 42, the cylinders 38 which have their ports 40 in communication with the port 42 will be subject to fluid pressure which forces the corresponding pistons 58 to the left in Figs. 1 and 2. Due to the inclination of the thrust member 70 a force is created tangentially to the cylinder barrel at the cylinder axes causing the barrel to revolve carrying with it the shaft 28. The pistons of the cylinders which have their ports 40 in communication with the port 44 are thereby forced to the right in Figs. 1 and 2 expelling a corresponding quantity of fluid into the passage 80 and connection 24.

The flanges 60 are at all times maintained in contact with the thrust plate 70 by the piston return cam 72. While, during normal operation as a fluid motor, fluid pressure in the cylinders 38 automatically maintains the flanges 60 against the plate 70, conditions of operation sometimes arise when this is not true, such, for example, as when the load tends to overhaul the motor and operate it as a pump. Under these conditions the return of each of the pistons 58 is assured by the cam 72, thus maintaining a positive drive relation between the load device and and the prime mover connected to the pump which supplies pressure fluid. The cam 72 being formed of non-metallic material may be adjusted to be very slightly deformed by each of the flanges 60 whereby lost motion between the flanges and the plate 70 and the noisy operation which would result therefrom is positively avoided. The stream line formation of the passages 78 and 80 assists materially in reducing fluid friction losses in the device since the change in cross section of the fluid passage between the circular conduit connection 22 and the arcuate valve port 42 is made gradually over a substantial distance.

While the form of embodiment of the invention as herein disclosed, constitutes a preferred form, it is to be understood that other forms might be adopted, all coming within the scope of the claims which follow.

What is claimed is as follows:

1. In a fluid pressure energy translating device the combination of a rotary cylinder barrel having a plurality of cylinders formed therein parallel to and spaced around the axis of barrel rotation and having fluid ports, one at one end of each cylinder, a casing including a valve plate having a pair of arcuate ports cooperating with said cylinder ports, a thrust plate mounted in the casing and having a flat annular surface inclined to the barrel axis, a plurality of pistons reciprocable in the cylinders said pistons having flanges at their outer ends bearing directly against said surface and a piston return cam having a generated non-planar surface mounted in the casing and bearing against the under side of the flanges to maintain the piston flanges against the thrust plate.

2. In a fluid pressure energy translating device the combination of a rotary cylinder barrel having a plurality of cylinders formed therein parallel to and spaced around the axis of barrel rotation and having fluid ports, one at one end of each cylinder, a casing including a valve plate having a pair of arcuate ports cooperating with said cylinder ports, a thrust plate mounted in the casing and having a flat annular surface inclined to the barrel axis, a plurality of pistons reciprocable in the cylinders said pistons having flanges at their outer ends bearing directly against said surface and a non-metallic piston return cam mounted in the casing to bear against the under side of the flanges and be slightly deformed thereby, to maintain the piston flanges against the thrust plate.

3. In a fluid pressure energy translating device the combination of a rotary cylinder barrel having a plurality of cylinders formed therein parallel to and spaced around the axis of barrel rotation and having fluid ports, one at one end of each cylinder, a casing including a valve plate having a pair of arcuate ports cooperating with said cylinder ports, a thrust plate mounted in the casing and having a flat annular surface inclined to the barrel axis, a plurality of pistons reciprocable in the cylinders said pistons having flanges at their outer ends bearing directly against said surface and a piston return cam mounted in the casing and bearing against the under side of the flanges to maintain the piston flanges against the thrust plate, said flanges having oppositely facing truncated conical surfaces one of which engages said thrust plate with a line contact at all piston positions, said cam having a surface generated to engage the other conical surface of each piston with a line contact at all piston positions.

4. In a fluid pressure energy translating device the combination of a rotary cylinder barrel having a plurality of cylinders formed therein parallel to and spaced around the axis of barrel rotation and having fluid ports, one at one end of each cylinder, a casing including a valve plate having a pair of arcuate ports cooperating with said cylinder ports, a thrust plate mounted in the casing and having a flat annular surface inclined to the barrel axis, a plurality of pistons reciprocable in the cylinders said pistons having flanges at their outer ends bearing directly against said surface and a piston return cam mounted in the casing and having a surface so shaped and positioned as to bear against the under side of the flanges to maintain the piston flanges against the thrust plate at all piston positions.

THOMAS B. DOE.
EDWIN L. ROSE.
CHRISTIAN E. GROSSER.